United States Patent [19]

Kanamaru et al.

[11] Patent Number: 4,976,945
[45] Date of Patent: Dec. 11, 1990

[54] PROCESS FOR PRODUCING CARBON BLACK

[75] Inventors: Shinichi Kanamaru; Shushichi Yoshimura; Hideyuki Hisashi; Akinori Sakaue, all of Kitakyushu, Japan

[73] Assignee: Mitsubishi Kasei Corporation, Tokyo, Japan

[21] Appl. No.: 356,211

[22] Filed: May 24, 1989

[30] Foreign Application Priority Data

May 24, 1988 [JP] Japan ................ 63-126825

[51] Int. Cl.$^5$ .............................. C01B 31/02
[52] U.S. Cl. .................... 423/450; 423/445; 423/449; 423/458
[58] Field of Search ............... 423/445, 449, 450, 458; 106/472

[56] References Cited

U.S. PATENT DOCUMENTS

| | | | |
|---|---|---|---|
| 3,301,694 | 1/1967 | Kraus et al. | 423/450 |
| 3,347,633 | 10/1967 | Johnson | 423/450 |
| 3,574,547 | 4/1971 | Hinsen | 423/445 |
| 3,787,562 | 1/1974 | Heller et al. | 423/445 |
| 3,793,438 | 2/1974 | Gunnell et al. | 423/450 |
| 3,952,087 | 4/1976 | Antonsen et al. | 423/445 |

FOREIGN PATENT DOCUMENTS

| | | | |
|---|---|---|---|
| 2403545 | 8/1975 | Fed. Rep. of Germany | 423/450 |
| 211457 | 7/1984 | German Democratic Rep. | 423/450 |
| 2151604 | 7/1985 | United Kingdom | 423/445 |

Primary Examiner—Olik Chaudhuri
Assistant Examiner—Robert M. Kunemund
Attorney, Agent, or Firm—Oblon, Spivak, McClelland, Maier & Neustadt

[57] ABSTRACT

A process for producing carbon black by thermally decomposing a hydrocarbon starting material in a production furnace by introducing the starting material to a high temperature zone heated by a high temperature combustion gas formed by burning a fuel and an oxygen-containing gas by a high temperature combustion gas-generating burner, characterized in that an alkali metal compound and/or alkaline earth metal compound is (A) introduced from alkali burner, burner specially itemed for ionizing the alkali metal compound and/or alkaline earth metal compound, set independently from said high temperature combustion gas-generating burner, for burning a mixture of a fuel and an oxygen-containing gas, or (B) ionized in an ionizing furnace specially itemed for ionizing the alkali metal compound and/or alkaline earth metal compound, and then introduced to the production furnace.

3 Claims, 4 Drawing Sheets

PROCESS FOR PRODUCING CARBON BLACK

The present invention relates to a process for producing carbon black. More particularly, the present invention relates to a process for producing carbon black having a low structure and/or large surface area in a low ash content state without damaging the furnace wall in a high temperature atmosphere.

Carbon black is produced usually by various methods such as a channel method, a thermal method, a furnace method (gas and oil), an acetylene black method, a partial oxidation reaction method of heavy oil (Shell method, a Texaco method, a Fauzer method, etc.). Among them, the most economical and most widely employed method is the furnace method.

In the furnace method, a hydocarbon starting material is introduced to a high temperature combustion gas stream obtained by burning a fuel with an oxygen-containing gas such as air, to partially burn and/or thermally decompose the starting material to form carbon black. Carbon black suspended in the high temperature combustion gas after completion of the reaction, is cooled by a usual method such a water spraying method and then separated and collected by a cyclone or by a bag filter.

Carbon black thus obtained is widely used as a rubber-reinforcing material for e.g. automobile tires, as a pigment for resins, coating materials and inks, or as an electrical conductivity-imparting material for resins and rubbers.

The furnace method is an excellent method whereby the properties of the resulting cabon black such as the surface area, the particle size and the structure, can be adjusted by changing the reaction condition of the hydrocarbon starting material in the production furnace for carbon black, such as the position for introduction and the flow rate of the hydrocarbon starting material, the manner for introduction and the flow rate of the oxygen-containing gas for fuel and the configuration of the reactor.

However, the change of the reaction condition or the shape of the production furnace tends to bring about a drawback such that the yield of carbon black decreases, or the controlling range of the properties is narrow. It has been proposed to introduce an additive to overcome such drawbacks.

For example, Japanese Examined Patent Publication No. 3168/1961 proposes to adjust the structure and the modulus of elasticity of the resulting cabon black by introducing a solution of an alkali metal to the high temperature atmosphere alone or together with a fuel for the high temperature combustion gas-generating burner, an oxygen-containing gas or the hydrocarbon starting material.

Further, Japanese Examined Patent Publications No. 28104/1964 and No. 3365/1969 propose to adjust the surface area and the modulus of elasticity of carbon black by introducing an alkaline earth metal such as barium, calcium, magnesium or strontium in the same manner as above.

By increasing the amount of the additive, the structure is controlled (or becomes small) and the surface area increases, but a part of the additive remains in the formed carbon black, whereby the ash content composed mainly of an alkali metal or alkaline earth metal increases, which adversely affects the physical properties in practical application. Further, there has been a problem that the alkali metal or alkaline earth metal deposits on the furnace wall in the high temperature atmosphere and damages the refractory bricks of the furnace wall. (This phenomenon is called "sporling".)

Namely, there has been a limitation to the amount of the alkali metal or alkaline earth metal to be added. Accordingly, there has been a limitation to the extent for controlling the structure, the surface area, etc.

Under the circumstances, the present inventors have conducted extensive researches for a process for readily and economically producing carbon black having a lower structure or a larger surface area with a low ash content without damaging the bricks in the high temperature atmosphere. As a result, they have found that in a commonly employed method for producing carbon black such as a furnace method, it is possible to remarkably lower the structure and/or remarkably enlarge the surface area of the resulting carbon black by (A) introducing an alkali metal compound and/or alkaline earth metal compound from burner specially set for the item of ionizing the alkali metal compound and/or alkaline earth metal compound in the reactor together with a fuel or an oxygen-containing gas, or (B) introducing into the reactor an alkali metal compound and/or alkaline earth metal compound ionized by an ionizing furnace specially itemed for the ionization of alkali metal compound and/or alkaline earth metal compound independent from the reactor, and that it is possible to obtain carbon black having a remarkably low ash content with the same amount of the alkali metal compound and/or alkaline earth metal compound or for the same structure or surface area of the resulting carbon black. It also has the merit such that to obtain a product with the ash content of conventional product, less alkali metal compound or alkaline earth metal compound is required. Further, the fact that there is no deposition of the alkali metal compound and/or alkaline earth metal compound on the surface wall brings a merit such that the damage to the refractory bricks, for example sporling by alkali metal compound and/or alkaline earth metal compound, can be prevented. The present invention has been accomplished on the basis of these discoveries.

Thus, the object of the present invention is to provide a process for producing carbon black having a low structure or a large surface area with a low ash content without damaging the furnace wall for a high temperature atmosphere.

The present invention provides a process for producing carbon black by thermally decomposing a hydrocarbon starting material in a reactor by introducing the starting material to a high temperature zone heated by a high temperature combustion gas formed by burning a fuel and an oxygen-containing gas by a high temperature combustion gas-generating burner, characterized in that an alkali metal compound and/or alkaline earth metal compound is (A) introduced from alkali burner, burner specially set for the item of ionizing the alkali metal compound and/or alkaline earth metal compound, for burning a mixture of a fuel and an oxygen-containing gas independent from said high temperature combustion gas-generating burner, or (B) ionized in an ionizing furnace specially itemed for the ionization of alkali metal compound and/or alkaline earth metal compound, and then introduced to the reactor.

In the accompanying drawings:

FIGS. 4-1 and 4-2 illustrates embodiments wherein the alkali burner is mounted in a combustion chamber of the furnace for producing carbon black by a furnace method.

FIG. 5-1 is a transverse cross-sectional view illustrating the state of damage in the furnace and the state of deposition of the alkali metal compound in a case where the alkali metal compound is accompanied by the air for burning a fuel.

FIG. 5-2 is a cross-sectional view showing the state of damage in the furnace and the state of deposition of the alkaline earth metal compound in a case where the alkaline earth metal is introduced into the furnace as accompanied by the hydrocarbon starting material from the nozzle for supplying the hydrocarbon starting material.

Figure 1:
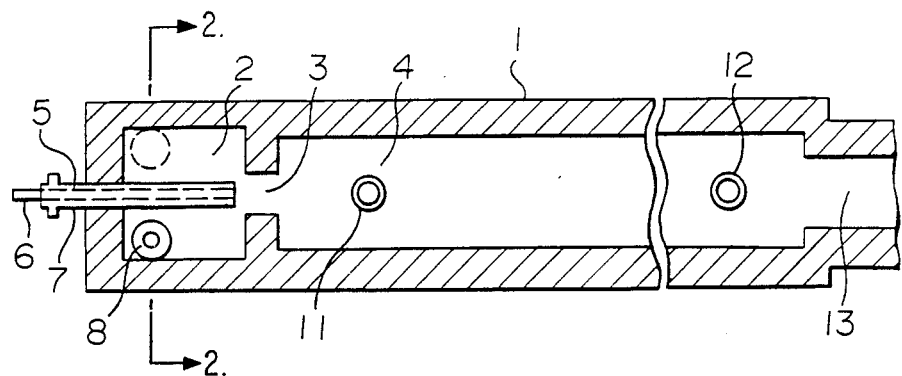
FIG. 1 is a diagrammatic vertical cross-sectional view of a furnace for producing carbon black by a furnace method.

Now, the present invention will be described in detail with reference to the preferred embodiments.

As the hydrocarbon starting material for the production of carbon black, any starting material commonly employed may be used. For example, there may be mentioned an aromatic hydrocarbon such as benzene, toluene, xylene, naphthalene or anthracene, or a tar-type or petroleum-type decomposed heavy oil such as creosote oil, anthracene oil, naphthalene oil, pitch oil or ethylene bottom oil.

As the fuel to obtain a heat necessary for decomposing the hydrocarbon starting material, there may be employed any gas fuel such as natural gas, propane, butene or coke oven gas, or a liquid fuel such as kerosine, light oil or heavy oil, so long as it can readily be burned completely and is capable of providing a heat necessary for decomposing the hydrocarbon starting material.

As the oxygen-containing gas to burn the fuel, it is common to employ air. However, oxygen may be mixed in an optional proportion to air or to a gas other than air, as the case requires.

The fuel is introduced into the reactor alone or together with a part of the oxygen-containing gas by a high temperature combustion gas-generating burner, and mixed and burned with the oxygen-containing gas introduced in the same manner to form a high temperature combustion gas. The ratio of the fuel to the oxygen-containing gas is selected so that the temperature of the high temperature combustion gas stream will be 1,400° to 2,000° C., preferably from 1,600° to 1,900° C. If the temperature is lower than this range, decomposition of the hydrocarbon starting material tends to be difficult. On the other hand, if the temperature is higher than the above range, the refractory bricks of the furnace wall tend to be damaged by the heat, such being undesirable. When an alkali burner is employed, its heat capacity should also be taken into accounts to determine the ratio of the fuel to the oxygen-containing gas.

The hydrocarbon starting material is introduced into the high temperature combustion gas and thereby partially burned and/or thermally decomposed to form carbon black.

The alkali metal compound of the present invention may be an inorganic salt such as a hydroxide, chloride, sulfate or carbonate, a salt of an organic acid including a fatty acid, or an organic metal compound such as a metal alkyl, of an alkali metal such as lithium, sodium, potassium, rubidium, cesium or francium, belonging to Group Ia of the Periodic Table. Likewise, the alkaline earth metal compound may be an inorganic salt such as a hydroxide, chloride, sulfate or carbonate, a salt of an organic acid including a fatty acid, or an organic metal compound such as a metal alkyl, of an alkaline earth metal such as magnesium, calcium, strontium or barium, belonging to Group IIa of the Periodic Table. Such an alkali metal compound and/or alkaline earth metal compound is added in an amount of from 500 to 50,000 ppm, preferably from 500 to 20,000 ppm, as the alkali metal or alkline earth metal relative to the hydrocarbon starting material.

In the present invention, it is important that the alkali metal compound and/or alkaline earth metal compound is (A) introduced together with a fuel and/or an oxygen-containing gas by means of burner specially set for the item of ionizing the alkali metal compound and/or alkaline earth metal compound, without mixing with the hydrocarbon starting material or with the fuel or air for forming the high temperature atmosphere or without introducing into the furnace alone and ionize it, or (B) ionized by an ionizing furnace specially itemed for the ionization of alkali metal compound and/or alkaline earth metal compound, without mixing with the hydrocarbon starting material or with the fuel or air for forming the high temperature atmosphere or without introducing into the furnace alone, and then introduced into the reactor.

(A) In the case where alkali burner (burner specially set for the item of ionizinq the metal compound) is employed:

The combustion zone of the alkali burner is maintained usually at a temperature higher than the temperature of the high temperature combustion gas-generating burner, in order to efficiently ionizing the alkali metal compound and/or alkaline earth metal compound. A suitable temperature of the combustion zone of the alkali burner varies depending upon the alkali metal compound and/or alkaline earth metal compound to be added. However, it is usually at least 1,500° C., preferably at least 1,900° C. The alkali burner is intended primarily to ionize the alkali metal compound and/or alkaline earth metal compound. Therefore, although its temperature is higher than the high temperature combustion gas-generating burner, the heat capacity generated is usually small. The fuel and the oxygen-containing gas introduced to the alkali burner may be the above-mentioned fuel and oxygen-containing gas useful for the high temperature combustion gas-generating burner.

Figure 3:
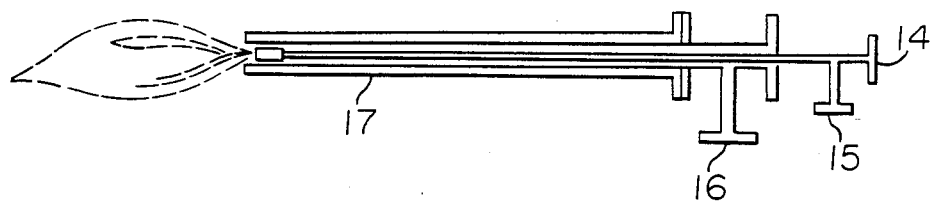
FIG. 3 shows an embodiment of an alkali burner used in the present invention.

The alkali metal compound and/or alkaline earth metal compound may be carried by either one or both of the oxygen-containing gas and the fuel. Otherwise, they may be introduced from an independent supply passage provided in the alkali burner. If this supply passage is provided as the outer most layer of the alkali burner, a part of the alkali metal compound and/or alkaline earth metal compound is likely to scatter around the periphery when jetting from the forward end, such being undesirable. Therefore, the supply passage is usually provided inside the passage for the oxygen-containing gas and/or fuel as the outermost layer. The center portion is preferred. For example, FIG. 3 illustrates an alkali burner whereby the alkali metal compound and/or alkaline earth metal compound is supplied together with an oxygen-containing gas.

There is no particular restriction as to the direction for introducing the alkali burner to a furnace. Namely, the alkali burner is directed in a transverse direction or in a coaxial direction relative to the direction for introducing the hydrocarbon starting material.

One alkali burner or a plurality of alkali burners may be employed. When an alkali metal compound and an alkaline earth metal compound are introduced in the same reaction furnace, it is desirable that they are introduced from separate alkali burners.

The position for jetting the alkali metal compound and/or alkaline earth metal compound from the alkali burner is perferably at the same level as or at the upstream side of the jetting position of the hydrocarbon starting material. If the jetting position of the alkali metal compound and/or alkaline earth metal compound is at the downstream side of the hydrocarbon starting material, liquid drops of the hydrocarbon starting material will contact with the alkali metal ions and/or alkaline earth metal ions after solidification and carbonization, whereby the controlling effect for e.g. the structure and the surface area tends to decrease, such being undesireable. It is important that ionized alkali metal and/or alkaline earth metal is brought in contact with the hydrocarbon starting material prior to solidification and carbonization. Further preferably, the jetting position is in the high temperature combustion gas stream formed by the above-mentioned high temperature combustion gas-generating burner.

(B) In the case where an ionizinq furnace specially itemed for the ionization of metal independent from the production furnace is empolyed:

The optimum temperature of the ionizing furnace varies depending upon the alkali metal compound and/or alkaline earth metal compound to be added. However, it is usually at least 1,300° C., preferably at least 1,500°.

For the ionizing furnace, a conventional heating system may be employed, such as a system wherein a fuel and an oxygen-containing gas are burned, an electric furnace system or an infrared system.

The ionized alkaline substance is introduced into the carbon black production furnace together with the combustion gas of the ionizing furnace or together with the carrier substance such as water, vapor or air employed for spraying the alkaline substance into the ionizing furnace.

Here, it is important that the ionized alkaline substance is kept warm with e.g. a heat sealing material so that it will not be cooled during the process for its introduction. The direction for introduction of the ionized alkaline substance into the furnace is not critical and may be in a transverse direction or in a coaxial direction relative to the direction for introduction of the hydrocarbon starting material.

One or a plurality of inlets may be provided for introduction of the ionized alkaline substance. When an alkali metal compound and an alkaline earth metal compound are introduced into the same reaction furnace, it is preferred that they are introduced from separate inlets.

The position for jetting the alkali metal compound and/or alkaline earth metal compound is preferably at the same level as or at the upstream side of the jetting position of the hydrocarbon starting material. If the jetting position of the alkaline earth metal compound and/or alkaline earth metal compound is at the downstream side of the jetting position of the hydrocarbon starting material, the hydrocarbon starting material will be in contact with the alkali metal ions and/or alkaline earth metal ions after solidification and carbonization, whereby the controlling effects for e.g. the structure and surface area tend to decrease, such being undesirable. It is important that the ionized alkali metal and/or alkaline earth metal is brought in contact with the hydrocarbon starting material prior to solidification and carbonization. Further preferably, the jetting position is in the high temperature combustion gas stream formed by the above-mentioned high temperature combustion gas-generating burner.

Carbon black formed by the above-method (A) or (B) is cooled with e.g. water at the downstream side of the reaction zone and then separated and collected by a cyclone or a bag filter.

The process for producing carbon black of the present invention wherein an alkali metal compound is added, is particularly effective for the production of carbon black where the DBP absorption as an index of the structure is at most 90 cc/100 g.

Now, the present invention will be described with reference to Examples. However, it should be understood that the present invention is by no means restricted to such specific Examples.

FIGS. 1 to 4 illustrate an embodiment of a furnace black reactor to carry out the present invention.

Figure 2:
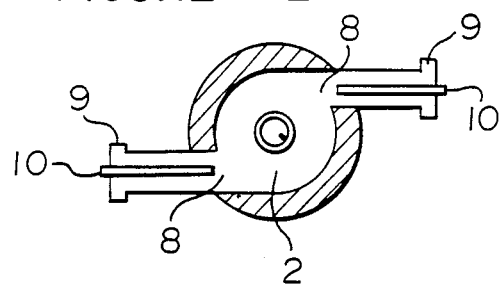
FIG. 2 is a diagrammatic cross-sectional view taken along line A—A' in FIG. 1.

FIG. 1 is a diagrammatic vertical cross-section of the furnace, and FIG. 2 is a diagrammatic vertical cross-section taken along line A—A' of FIG. 1.

In these Figures, reference numeral 1 indicates the furnace body, numeral 2 indicates a combustion chamber, numeral 3 indicates a choke, numeral 4 indicates a reaction chamber, numeral 5 indicates a nozzle for supplying the hydrocarbon starting material having a tube 6 as the inner tube and a cooling tube 7 as the outer tube, numeral 8 is an inlet for supplying a combustion gas comprising air supplied from an oxygen-containing gas inlet 9 and a fuel supplied from a fuel supply tube 10, numerals 11 and 12 indicate tubes for supplying cooling water to cool the passing stream, and numeral 13 indicates a flue.

Figures 1, 4:
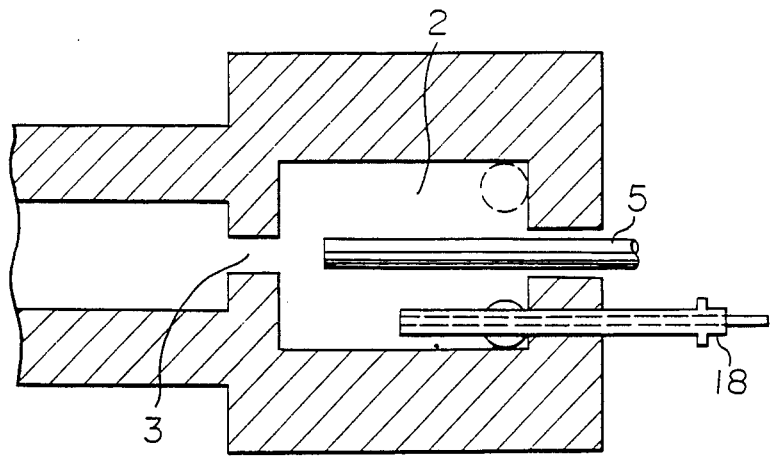
Figures 2, 4:
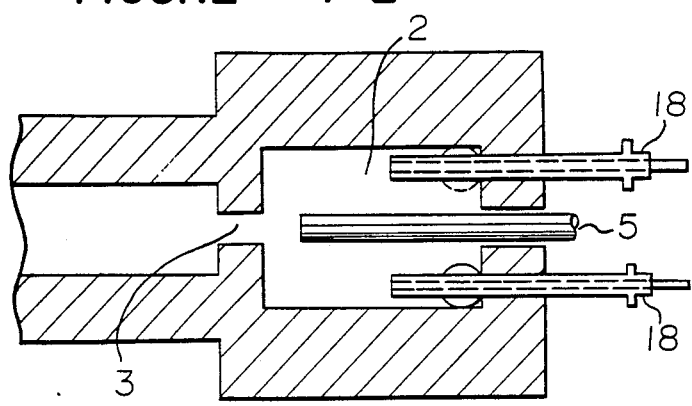

FIG. 3 illustrates an embodiment of the alkali burner. FIG. 4 illustrates the state where the alkali burner is inserted into the combustion chamber.

Numeral 14 indicates an inlet for air for combustion, numeral 15 indicates an inlet for the alkali metal salt, numeral 16 is an inlet for the combustion gas, numeral 17 is a cooling tube for the alkali burner, and numeral 18 indicates the state where the alkali burner is mounted.

Figure 6:
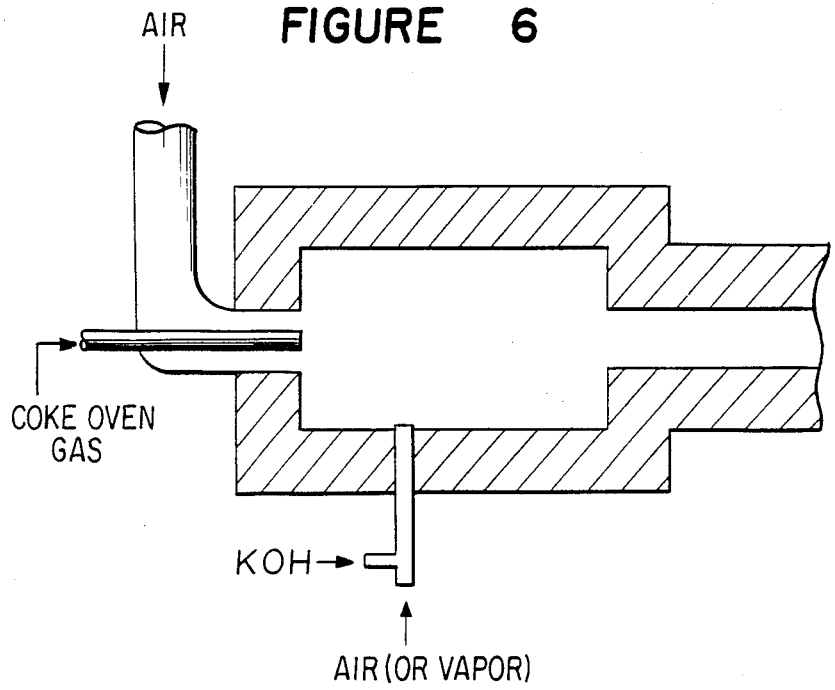
FIG. 6 illustrates an ionizing furnace of combustion system.
Figure 7:
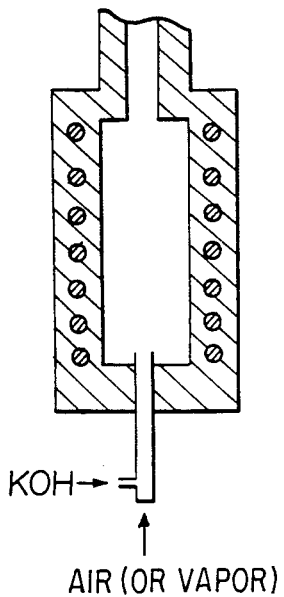
FIG. 7 illustrates an ionizing furnace of electrical furnace system.

FIG. 6 and 7 show embodiments of the ionizing furnace for ionizing the alkali metal compound and/or alkaline earth metal compound.

EXAMPLES 1 and 2

In Examples 1 and 2, KOH and NaOH were used, respectively, as the alkali metal compound. Such an alkali metal compound was introduced to the furnace by an alkali burner for the productoin of carbon black having a low DBP (dibutylphthalate) absorption. As will be apparent from the comparison with Comparative Examples 1 and 3 given hereinafter, carbon black having a remarkably low structure can be obtained with a low ash content when the alkali metal compound is introduced into the furnace by means of the alkali burner, with the same amount of addition.

EXAMPLES 3 and 4

In Examples 3 and 4, $CaCl_2$ and $(CH_3CO_2)_2CaH_2O$ were used, respectively, as the alkaline earth metal compound. Such an alkaline earth metal compound was introduced into the furnace by means of an alkali burner to conduct the production of carbon black having a large surface area. By using the alkali burner, it is possible to obtain carbon black having a large surface area with a low ash content with the same amount of addition. Besides, as compared with Comparative Example 4, in Example 3, the same level of surface area was obtained with a less amount of addition, whereby there was no damage to the furnace. A carbon black-suspended gas obtained by reacting in a carbon black reaction furnace of this structure under the production conditions as identified in Table 1 was subjected to a known collecting apparatus such as a cyclone or a bag filter to recover the carbon black. The physical properties of the carbon black are shown in Table 1.

In the Table, the particle size is the average value as observed by an electron microscope, the DBP absorption was the value measured by JIS K6221-1982, and the ash content and the iodine adsorption were values measured in accordance with JIS K6221-1982.

EXAMPLES 5 and 6

Examples 5 and 6 are Examples wherein the structure and the surface area were controlled by using KOH as the alkali metal compound and $CaCl_2$ as the alkaline earth metal compound. The two types of additives were introduced by means of two alkali burners as shown in FIG. 4-2, whereby the structure and the surface area care were controlled with a low ash content.

COMPARATIVE EXAMPLES 1 to 3

In Comparative Example 1, carbon black was produced under the same condition as in Example 1 except that the alkali metal compound was introduced from the tube 6 for supplying the hydrocarbon starting material, together with the hydrocarbon starting material.

In Comparative Example 2, carbon black was produced under the same condition as in Example 1 except that the alkali metal salt was introduced from the oxygen-containing gas inlet 9 together with air for combustion.

In Comparative Example 3, carbon black was produced under same condition as in Comparative Example 1 except that NaOH was used as the alkali metal compound, and the amount of addition to the hydrocarbon starting material was changed.

COMPARATIVE EXAMPLE 4

In Comparative Example 4, carbon black was produced under the same condition as in Example 3 except that the alkaline earth metal compound was introduced from the tube 6 for supplying the hydrocarbon starting material, together with the hydrocarbon starting material, and the amount of addition of the alkaline earth metal relative to the hydrocarbon starting material was changed.

COMPARATIVE EXAMPLE 5

In Comparative Example 5, carbon black was produced under the same condition as in Example 4 except that the alkali metal compound was introduced from the tube 6 for supplying the hydrocarbon starting material, together with the hydrocarbon starting material.

TABLE 1

|  | Example 1 | Example 2 | Example 3 | Example 4 | Example 5 | Example 6 | Comparative Example 1 | Comparative Example 2 |
|---|---|---|---|---|---|---|---|---|
| Means for introducing alkali metal or alkaline earth metal | Alkali burner | Alkali burner | Alkali burner | Alkali burner | Alkali burner | Alkali burner | Burner for supplying hydrocarbon starting material | Together with oxygen-supplying |
| Amount of air for combustion ($Nm^3$/hr) | 1,000 | 1,000 | 1,000 | 1,000 | 1,000 | 1,000 | 1,000 | 1,000 |
| Amount of fuel ($Nm^3$/hr) | 182 | 182 | 200 | 182 | 182 | 182 | 182 | 182 |
| Air for combustion of alkali burner ($Nm^3$/hr) | 115 | 115 | 115 | 115 | 115 | 115 | — | — |
| Fuel ($Nm^3$/hr) | 25 | 25 | 25 | 25 | 25 | 25 | — | — |
| Number of alkali burners | 1 | 1 | 1 | 1 | 2 | 2 | — | — |
| Amount of hydrocarbon starting material (kg/hr) | 85 | 85 | 70 | 70 | 85 | 85 | 85 | 85 |
| Type of alkali metal | KOH | NaOH | — | — | KOH | KOH | KOH | KOH |
| Amount of alkali metal to hydrocarbon starting material | 9,000 | 10,000 | — | — | 590 | 1,100 | 9,000 | 9,000 |
| Type of alkaline earth metal | — | — | $CaCl_2$ | $(CH_3CO_2)_2CaH_2O$ | $CaCl_2$ | $CaCl_2$ | — | — |
| Amount of alkaline earth metal to hydrocarbon starting material | — | — | 4,500 | 4,600 | 2,600 | 4,500 | — | — |
| Iodine adsorption (mg/g) | 260 | 261 | 750 | 810 | 510 | 590 | 255 | 260 |
| DBP absorption (ml/100 g) | 52 | 91 | 160 | 160 | 91 | 80 | 60 | 57 |
| Ash content (%) | 1.7 | 3.4 | 0.42 | 0.51 | 0.25 | 0.36 | 2.3 | 2.0 |
| Particle size (m$\mu$) | 14 | 14 | 14 |  | 13 | 13 | 14 | 14 |
| Deposition | Nil | Nil | Nil | Nil | Nil | Nil | Nil | Yes *1 |
| Damage to bricks | Nil | Nil | Nil | Nil | Nil | Nil | Nil | Yes *1 |

Comparative Comparative Comparative

TABLE 1-continued

|  | | Example 3 | Example 4 | Example 5 |
| --- | --- | --- | --- | --- |
| | Means for introducing alkali metal or alkaline earth metal | Burner for supplying hydrocarbon starting material | Burner for supplying hydrocarbon starting material | Burner for supplying hydrocarbon starting material |
| | Amount of air for combustion (Nm$^3$/hr) | 1,000 | 1,100 | 1,000 |
| | Amount of fuel (Nm$^3$/hr) | 182 | 200 | 182 |
| | Air for combustion of alkali burner (Nm$^3$/hr) | — | — | — |
| | Fuel (Nm$^3$/hr) | — | — | — |
| | Number of alkali burners | — | — | — |
| | Amount of hydrocarbon starting material (kg/hr) | 85 | 70 | 70 |
| | Type of alkali metal | NaOH | — | — |
| | Amount of alkali metal to hydrocarbon starting material | 10,000 | — | — |
| | Type of alkaline earth metal | — | CaCl$_2$ | (CH$_3$CO$_2$)$_2$CaH$_2$O |
| | Amount of alkaline earth metal to hydrocarbon starting material | — | 8,000 | 4,600 |
| | Iodine adsorption (mg/g) | 260 | 670 | 732 |
| | DBP absorption (ml/100 g) | 103 | 158 | 153 |
| | Ash content (%) | 9.0 | 1.0 | 1.1 |
| | Particle size (mμ) | 14 | 14 | |
| | Deposition | Nil | Yes *2 | Nil |
| | Damage to bricks | Nil | Yes *2 | Nil |

Figures 1, 5:
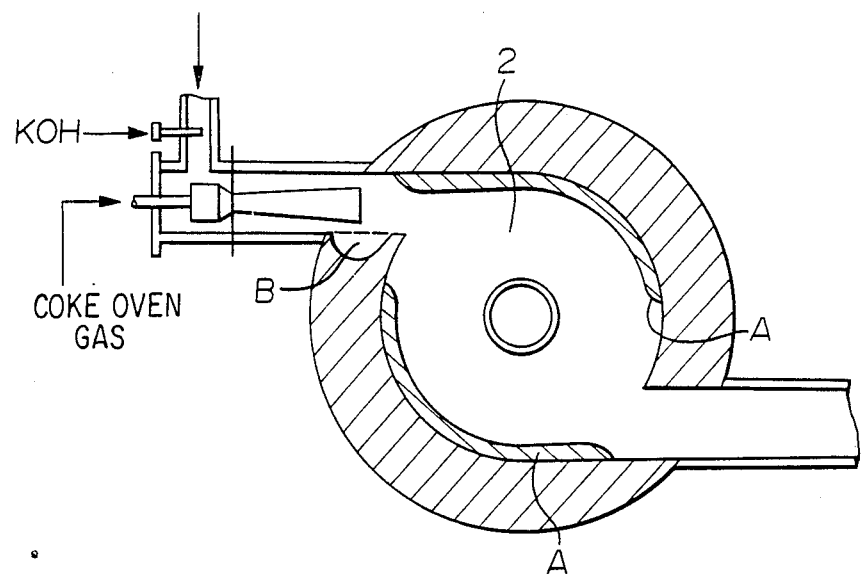
Figures 2, 5:
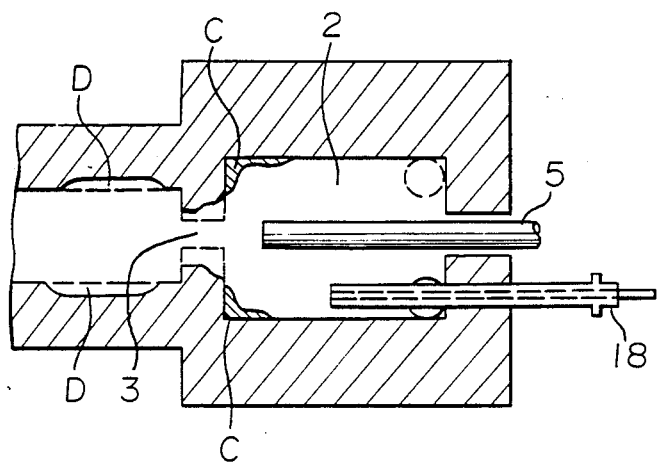
Figure 8:
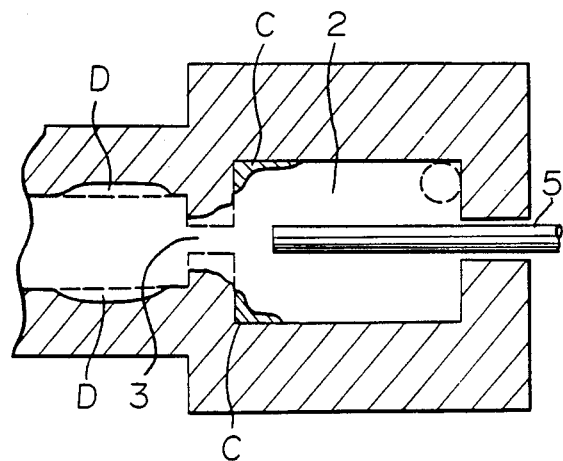
FIG. 8 is a cross-sectional view showing the state of damage within the furnace and the state of deposition of the alkaline earth metal compound in a case where the alkaline earth metal compound is introduced into the furnace as accompanied by the hydrocarbon starting material from the nozzle for supplying the hydrocarbon starting material.

*1: As shown at A in FIG. 5-1, the alkali metal compound was deposited in a thickness of from 5 to 10 mm. Further, at B, a damage of the brick was observed with a width of about 150 mm and a depth of about 100 mm.
*2: As shown at C in FIG. 5-2 and FIG. 8, the alkaline earth metal salt was deposited in a thickness of from 5 to 10 mm. Further at D, a damage of the brick was observed with a depth of from 10 to 30 mm from the inner wall surface of a normal condition.

EXAMPLE 7

In Example 7, KOH was used as the alkali metal compound. The alkali metal compound was ionized in an ionizing furnace of a combustion system as shown in FIG. 6, and then introduced into the furnace for the production of carbon black having a low DBP absorption. As is apparent from the comparison with Comparative Example 6, carbon black having a remarkably low structure was obtained with a low ash content at the same level of the amount of addition.

Further, no deposition of the alkaline substance in the furnace or no damage to the furnace was observed.

EXAMPLES 8 and 9

In Examples 8 and 9, CaCl$_2$ and (CH$_3$CO$_2$)$_2$CaH$_2$O were used, respectively, as the alkaline earth metal compound. Such an alkaline earth metal compound was ionized in an ionizing furnace and then introduced to the furnace for the production of carbon black having a large surface area.

As is apparent from FIG. 2 given hereinafter, as compared with the conventional technique, carbon black having a large surface area was obtained with low ash content at the same level of the amount of addition. Yet, carbon black having a large surface are was obtained with a less amount of addition.

Further, no deposition in the furnace or no damage to the furnace was observed.

EXAMPLE 10

Example 10 is an example wherein the structure and the surface area were simultaneously controlled by using KOH as the alkali metal compound and CaCl$_2$ as the alkaline earth metal compound.

COMPARATIVE EXAMPLE 6

In Comparative Example 6, carbon black was produced under the same condition as in Example 7 except that the alkali metal compound was introduced from the tube 6 for supplying the hydrocarbon starting material, together with the hydrocarbon starting material.

COMPARATIVE EXAMPLE 7

In Comparative Example 7, carbon black was produced under the same condition as in Example 7 except that the alkali metal salt was introduced from the oxygen-containing gas supply inlet 9 as shown in FIG. 2 together with air for combustion.

COMPARATIVE EXAMPLE 8

In Comparative Example 8, carbon black was produced under the same condition as in Example 8 except that the alkaline earth metal compound was introduced from the tube 6 for supplying the hydrocarbon starting material together with the hydrocarbon starting material, and the amount of addition of the alkaline earth metal to the hydrocarbon starting material was changed.

COMPARATIVE EXAMPLE 9

In Comparative Example 9, carbon black was produced under the same condition as in Example 10 except that the alkali metal compound was introduced from the tube 6 for supplying the hydrocarbon starting material together with the hydrocarbon starting material.

The carbon black-suspended gas obtained in each of Examples 7 to 10 and Comparative Examples 6 to 9 was subjected to a known collecting apparatus such as a cyclone or a bag filter to recover the carbon black. The physical properties of the carbon black are shown in Table 2.

In the Table, the particle size is average value as observed by an electron microscope, the DBP absorption, the ash content and the iodine adsorption were the values measured in accordance with JIS K6221-1982.

duction furnace by introducing the starting material to a high temperature zone heated by a high temperature combustion gas formed by burning a fuel and an oxygen-containing gas by a high temperature combustion gas-generating burner, characterized in that an alkali metal compound or alkaline earth metal compound or a

TABLE 2

|  | Example 7 | Example 8 | Example 9 | Example 10 |
|---|---|---|---|---|
| Means for introducing alkali metal or alkaline earth metal | Ionizing furance | Ionizing furnace | Ionizing furnace | Ionizing furnace |
| Amount of air for combustion (Nm$^3$/hr) | 1,000 | 1,100 | 1,000 | 1,000 |
| Amount of fuel (Nm$^3$/hr) | 182 | 200 | 182 | 182 |
| Amount of hydrocarbon starting material (kg/hr) | 85 | 70 | 70 | 85 |
| Amount of air for combustion of ionizing furnace (Nm$^3$/hr) | 250 | 250 | 250 | 250 |
| Air for combustion of ionizing furnace (Nm$^3$/hr) | 50 | 50 | 50 | 50 |
| Type of alkali metal | KOH | — | — | KOH |
| Amount of alkali metal to hydrocarbon starting material (mg/kg) | 9,000 | — | — | 590 |
| Type of alkaline earth metal | — | CaCl$_2$ | (CH$_3$CO$_2$) CaH$_2$O | CaCl$_2$ |
| Amount of alkaline earth metal to hydrocarbon starting material (mg/kg) | — | 4,500 | 4,600 | 2,600 |
| Iodine adsorption (mg/g) | 265 | 790 | 850 | 545 |
| DBP absorption (ml/100 g) | 50 | 166 | 173 | 86 |
| Ash content (%) | 1.5 | 0.35 | 0.43 | 0.18 |
| Particle size (m$\mu$) | 14 | 13.4 | 13.8 | 14 |
| Deposition | Nil | Nil | Nil | Nil |
| Damage to bricks | Nil | Nil | Nil | Nil |

|  | Comparative Example 6 | Comparative Example 7 | Comparative Example 8 | Comparative Example 9 |
|---|---|---|---|---|
| Means for introducing alkali metal or alkaline earth metal | Burner for supplying hydrocarbon starting material | Together with oxygen-supplying gas | Burner for supplying hydrocarbon starting material | Burner for supplying hydrocarbon starting material |
| Amount of air for combustion (Nm$^3$/hr) | 1,000 | 1,000 | 1,100 | 1,000 |
| Amount of fuel (Nm$^3$/hr) | 182 | 182 | 200 | 182 |
| Amount of hydrocarbon starting material (kg/hr) | 85 | 85 | 70 | 70 |
| Amount of air for combustion of ionizing furnace (Nm$^3$/hr) | — | — | — | — |
| Air for combustion of ionizing furnace (Nm$^3$/hr) | — | — | — | — |
| Type of alkali metal | KOH | KOH | — | — |
| Amount of alkali metal to hydrocarbon starting material (mg/kg) | 9,000 | 9,000 | — | — |
| Type of alkaline earth metal | — | — | CaCl$_2$ | (CH$_3$CO$_2$)$_2$ CaH$_2$O |
| Amount of alkaline earth metal to hydrocarbon starting material (mg/kg) | — | — | 8,000 | 4,600 |
| Iodine adsorption (mg/g) | 255 | 260 | 670 | 732 |
| DBP absorption (ml/100 g) | 60 | 57 | 158 | 153 |
| Ash content (%) | 2.3 | 2.0 | 1.0 | 1.1 |
| Particle size (m$\mu$) | 14 | 14 | 14 | 14 |
| Deposition | Nil | Yes | Yes | Nil |
| Damage to bricks | Nil | Yes | Yes | Nil |

As described in the foregoing, according to the process of the present invention, the efficiency of addition of the alkali metal compound and/or alkaline earth metal compound can be remarkably improved, whereby carbon black having the structure or the surface area controlled by the above compounds can be obtained with remarkably low ash content. Yet, it is thereby possible to avoid the damage to the furnace or prevent the deposition in the furnace.

We claim:

1. A process for producing carbon black by thermally decomposing a hydrocarbon starting material in a production furnace by introducing the starting material to a high temperature zone heated by a high temperature combustion gas formed by burning a fuel and an oxygen-containing gas by a high temperature combustion gas-generating burner, characterized in that an alkali metal compound or alkaline earth metal compound or a mixture thereof is (A) introduced from an alkali burner which burner is used for ionizing the alkali metal compound or alkaline earth metal compound, and which is set independently from said high temperature combustion gas-generating burner that burns a mixture of a fuel and an oxygen-containing gas, or (B) ionized in an ionizing furnace used for ionizing the alkali metal compound or alkaline earth metal compound or a mixture thereof, and then introducing said compound or mixture thereof into the production furnace.

2. The process for producing carbon black according to claim 1, wherein the jetting position of the alkali burner is at the same location as or at an upstream side of the jetting position of the hydrocarbon starting material.

3. The process for producing carbon black according to claim 1, wherein the jetting position of the ionized alkali metal compound or alkaline earth metal compound or a mixture thereof is at the same location as, or at an upstream side of the jetting position of the hydrocarbon starting material.

* * * * *